March 7, 1972  NOBUYASU GOMADA ET AL  3,647,577
INDUCTION HARDENED, ANTI-WEAR MECHANICAL MEMBERS
Filed Aug. 21, 1968  3 Sheets-Sheet 1

INVENTORS
NOBUYASU GOMADA
GENZO KOSAKA
BY Henry A. Mugullogh
ATTORNEY

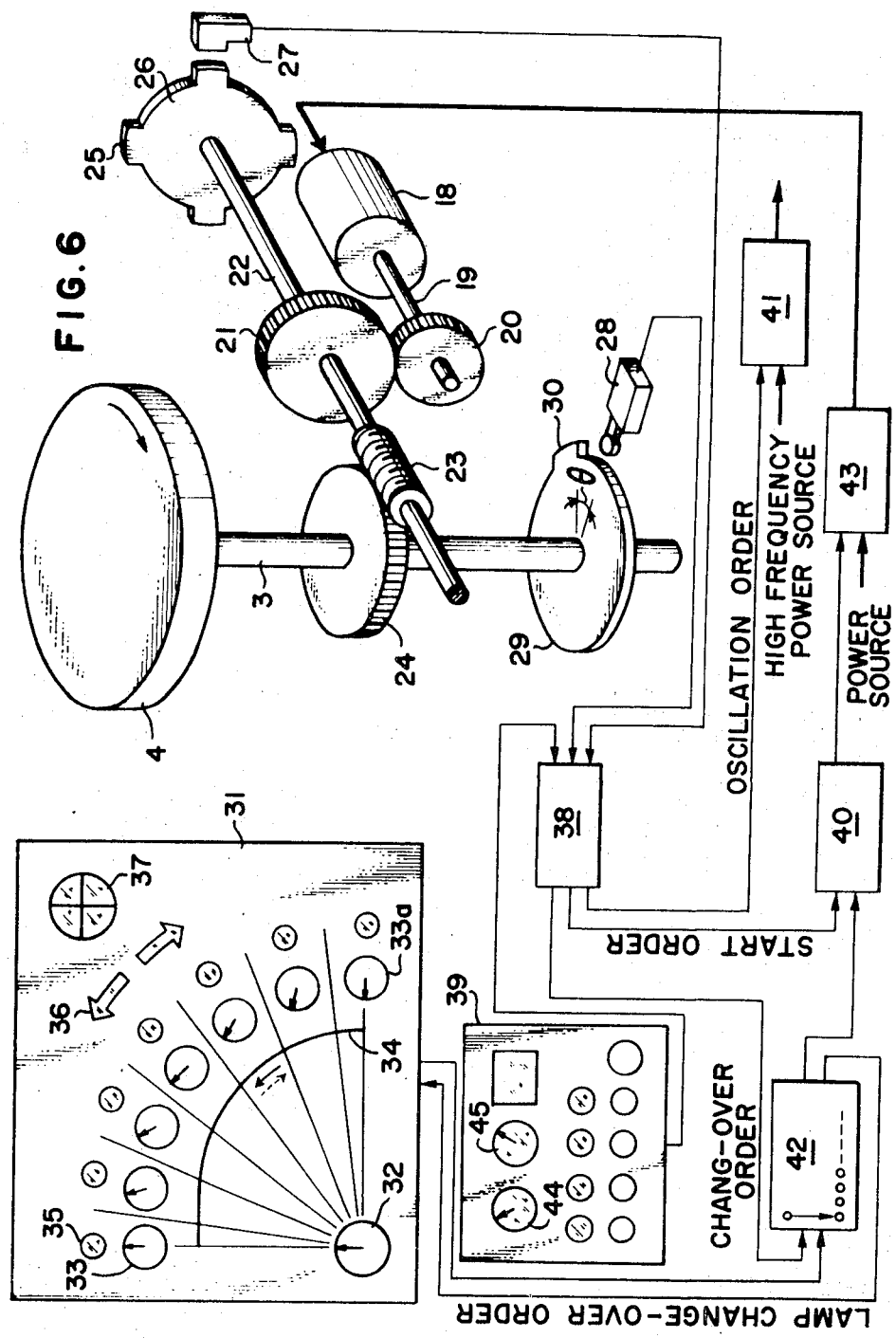

United States Patent Office 3,647,577
Patented Mar. 7, 1972

3,647,577
INDUCTION HARDENED, ANTI-WEAR
MECHANICAL MEMBERS
Nobuyasu Gomada and Genzo Kosaka, Hiroshima-shi, Japan, assignors to Toyo Kogyo Co., Ltd., Hiroshima-ken, Japan
Filed Aug. 21, 1968, Ser. No. 754,340
Claims priority, application Japan, Aug. 30, 1967, 42/55,601; Sept. 14, 1967, 42/56,674
Int. Cl. C21d 1/10
U.S. Cl. 148—150
5 Claims

ABSTRACT OF THE DISCLOSURE

A mechanical member with a flat anti-wear surface with which a mating member moves in sliding contact wherein the member is partially induction hardened at the surface layer thereof in such manner as to form many separate hardened layers which are distributed in the surface layer radially and concentrically with respect to the center of the surface of the member; a process for the partial induction hardening of a flat member which comprises the steps of supporting an induction heating coil above a radius vector of the surface layer to be partially hardened of the flat member so that an alternate magnetic flux density is kept uniform throughout the surface layer by applying a high frequency electric current intermittently through the heating coil to heat the layers to be hardened on said surface layer while revolving the member, and quenching the heated layers by a cooling medium thereby to form many separate hardened layers which are distributed as mentioned above.

---

This invention relates to a process for partically induction hardening the surface layer of a planar or flat mechanical member, which a mating member moves in sliding contact with, by high frequency induction heating thereby forming many separate hardened layers which are distributed in the surface layer radially and concentrically with respect to the center of the surface of the member, to a flat member partially quench hardened by the process and to an apparatus adapted for the practice of the process.

The invention has for its object the efficient manufacture of partially hardened members having always sufficient strength and wear resistance for the intended applications by effecting the hardening in such way as to reduce the quenching strain or warping and minimize the allowance for finishing as by grinding.

As is well known, in the induction hardening of a flat member or work on the surface alon,e the customary practice of hardening the entire surface involves such a high degree of quenching strain (i.e., warpage) that the dimensional accuracy of flatness is materially adversely affected. Moreover, subsequent grinding or other finish machining of the hardened surface will locally remove much of the hardened layer, thus rendering it difficult to obtain a final hardened layer of uniform hardening depth or pentration and hence to obtain a finished article with a uniform wear resistance. In view of these and other shortcomings of the conventional practice, an attempt has been made to quench harden a member to a greater depth in consideration of quenching strain to be caused and the attendant increase of machining allowance required. However, this has caused an even greater warpage, and some improvement attained in this case in the uniformity of wear resistance has been insufficient to offset a consequent demand for a larger number of man-hours for the hardening and surfacing operations. Especially for thin-walled members which are required to combine good mechanical properties with wear resistance, the hardening penetration must be limited to a minimum in order to avoid sacrificing their mechanical properties. Thus, quenching hardening to a greater depth of a member presents problems, and the surface hardening of the member as desired has been considered to be very difficult to effect.

The present invention is directed to overcome the foregoing difficulties of the conventional processes, and is based on a finding that when the surface layer of a flat member is partially hardened so that many separate hardened layers are formed side by side radially and concentrically in the surface layer as hereinafter fully described, the resulting warpage of the hardened member will be less than half to one third that of an entirely hardened member and the member thus partially hardened is equal or even superior in wear resistance to the conventionally hardened ones.

In general, quench hardening of the surface layer of a member so that simply parallel stripes of hardened layers are obtained, is not remarkably effective in inhibiting warpage. However, when partially hardened so that many separate hardened layers to be obtained are specially distributed "radially and concentrically" throughout its surface layer in accordance with the present invention, a member will have a quenching strain remarkably less than that produced by the conventional processes. (Separate hardened layers distributed "radially and concentrically" in the surface layer of a member mean herein the ones distributed as shown in FIG. 1 to be hereinafter described.) The two are identical in that most of the strain caused by the hardening is absorbed by the rest of the surface which is not hardened. The difference then seems attributable to the fact that in the former the directional character of hardening causes a buildup of residual warpage left unabsorbed due to the increases in the hardness penetration, number of hardened stripes and the width of individual stripes, while in the latter the lack of directionality of the hardened layers results in only a negligible buildup of warpage.

FIG. 6 is a block diagram illustrating a form of control mechanism for the hardening apparatus;

Figure 1:
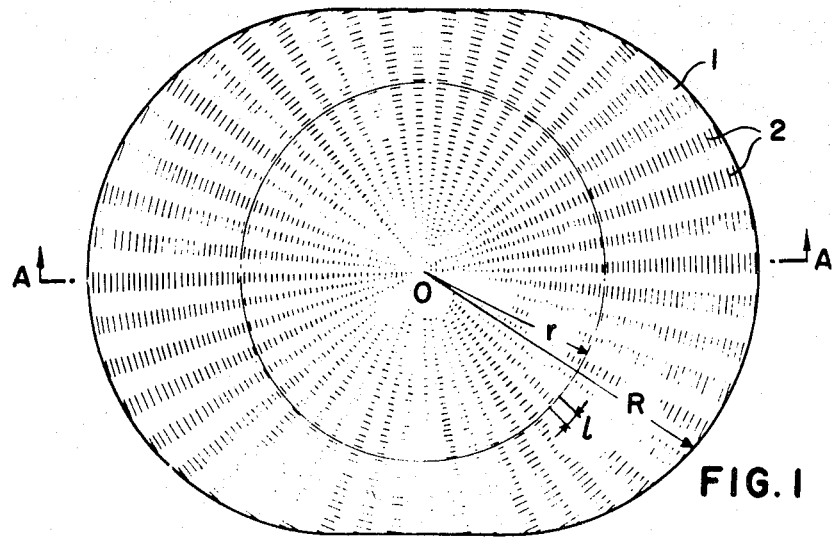
FIG. 1 is a plan view of partially induction hardened member the surface layer of which is partially hardened in such manner as to form many separate hardened layers which are distributed in the surface layer "radially and concentrically" with respect to the center of the surface of the member.
Figure 2:
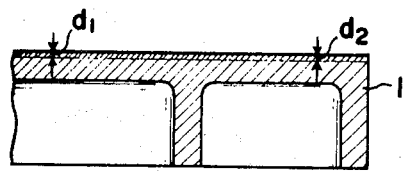
FIG. 2 is a fragmentary vertically sectional view taken along the line A—A of FIG. 1.
Figure 3:
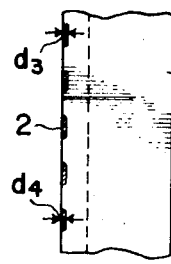
FIG. 3 is a side view of a fragment of the member shown in FIG. 1.

In order to provide a member with a wear resistance as uniform throughout its surface as possible by partially hardening the surface in accordance with the present invention, certain conditions including the following must be satisfied. As illustrated in FIGS. 1 to 3, (1) hardening penetration or depth at given points of the hardened layers 2 of a hardened member 1 must be substantially the same, i.e., $d_1 \doteq d_2 \doteq d_3 \doteq d_4$, (2) on a circle of a given radius $r$ from an origin which is the center 0 of the hardened member 1, the ratio of the sum of individual arcs representing the hardened layers to the circumference must be kept substantially constant, i.e., $$\frac{\sum_{i=1}^{n} li}{2lr} \doteq c$$

(where $l$ represents the length of arc; $n$, the number of separate hardened layers; $r$, the radius, and $c$, the constant), and (3) as many separate hardened layers as possible are formed. To meet these requirements, the present invention relies upon a hardening procedure now to be described.

Figure 5:
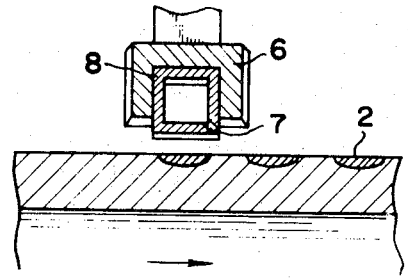
FIG. 5 is an enlarged sectional view taken along the line B—B of FIG. 4.
Figure 4:
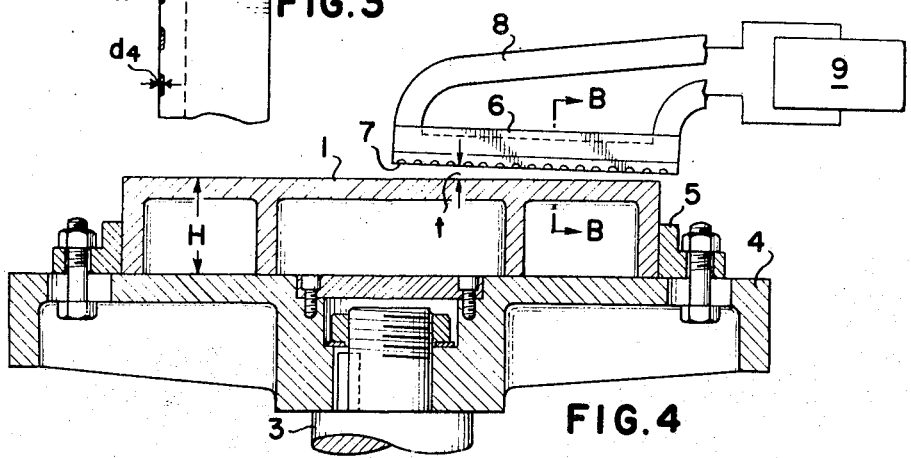
FIG. 4 is a vertical sectional view of the essential member of a quench hardening apparatus showing how a coil for induction heating is set in position.

An embodiment of the process of the present invention and an apparatus therefor will be described with reference to the accompanying drawings. Referring specifically to FIG. 4, a member to be hardened (hereinafter referred to as a member for simplicity) 1 is detachably secured in position by a plurality of jigs 5 on a table 4 mounted on a spindle 3 that is driven by a moter via reduction gear. An induction heating coil 8 which is provided with a ferrite core 6 and a number of ports for cooling water 7, is connected to a high frequency oscillator 9 and is held above the member 1 so that it covers the radius vector R of the latter. This induction heating coil 8 is supported adjustably in position vertically by the usual means in order to meet the variation in height H of the member 1. The coil is also arranged so that it can be withdrawn integrally with the support means from above the table 4 when the member 1 is to be placed in or out of the working position. An alternative arrangement may be provided whereby the table 4 can recede in place of the induction coil 8. While the ports 7 for cooling water are so formed at a suitable angle in the heating coil 8 as shown in FIG. 5 that they will not permit the cooling water to flow over unhardened area of the member, it is desirable to combine this with a slightly slant installation of the apparatus as a whole, or with blowing of air from the opposite side in order to prevent the water from flowing over the unhardened area.

Figure 7:
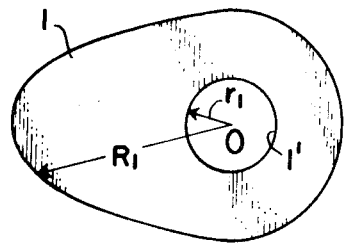
FIGS. 7 and 8 are plan views showing members of other contours to be hardened.
Figure 8:
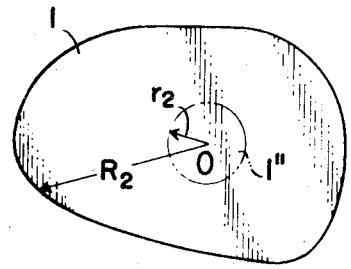

In hardening a member or workpiece having a hole or holes, the well-known technique of avoiding unnecessary hardening operation over the void by inserting a copper plug in each hole may of course be adopted. In the case of a member 1 having a round hole 1' in the center as shown in FIG. 7, or a member 1 having a round portion 1'' in the center that is not to be hardened as shown in FIG. 8, it is possible to harden the desired surface only by displacing the induction heating coil 8 beforehand by a distance $r_1$ or $r_2$ toward the periphery along the radius vector from the rotation center 0 of the member.

In order to ensure uniformity of hardening depth or penetration at given points of the individual hardened layers, the alternate magnetic flux density per unit area of the surface being hardened must be kept constant. Thus, if a desired depth of hardening $d$ is given with a constant power supply, the coil 8 for induction heating is set in the following way. In consideration of the heating efficiency, prevention of spark, and other factors, the gap $t$ between the coil 8 and the member 1 reaches an optimum minimum ($t_{min}$) along the periphery of the maximum radius ($R_{max}$), and the revolution velocity of the table is so adjusted that desired hardening depth $d$ will be obtained and the velocity so adjusted is regarded as the basic velocity. It is now only necessary to tilt the induction heating coil 8 at a desired angle on the basis of the optimum minimum gap so that the hardening penetration at given points between the center of hardened layers and the outer periphery may be kept substantially the same at this basic velocity. In this embodiment of the invention, uniformity of hardening penetration is further ensured by suitably adjusting the cross sectional area of the ferrite core 6 according to the values of the alternate magnetic flux and gap $t$, as shown in FIGS. 4 and 5. When the coil 8 for induction heating equipped with the ferrite core 6 is provided over the radius vector of a circular member as stated above and when a high frequency current is applied to the coil at regular intervals for a predetermined period of time while turning the table at the basic velocity, then the circular member can be hardened as desired on the surface.

In the case of a noncircular member, however, the alternate magnetic flux density per unit area of the member surface varies with the change of the area covered by the coil per unit time or, stated differently, in inverse proportion to the square of the length of radius vector of the member (in case of FIGS. 7 and 8, $R_1^2 - r_1^2$ and $R_2^2 - r_2^2$, respectively) when the table is turned uniformly at the basic velocity. Therefore, in order that the hardening penetration by made substantially constant at given points of the hardened layers on the noncircular member, it is necessary to control the turning of the table in such manner that the area velocity of the member surface to be hardened (the surface area to be covered by R in FIG. 1 or by $R_1 - r_1$ and $R_2 - r_2$ in FIGS. 7 and 8, respectively, as the table turns) be kept constant depending upon the length of radius vector of the member.

According to the present invention, the abovementioned arrangement is controlled by a control mechanism for governing the turning speed of the table in accordance with a program that divides the member surface beforehand in to a number $m$ of equi-angular sectors with the center of revolution as the origin for the reason above stated, preferably establishing a relationship of $n = am$ where $a$ is a positive integer and $n$ the number of hardened layers, and renders the average area velocity of the member surface in the respective regions thus divided constant as a rule, while adjusting the hardening penetration locally where desired, and also by a two-system control mechanism for controlling the number of hardened layers and the hardening intervals by similarly dividing the member surface into equi-angular sectors or dividing the period of time required for each revolution of the member into periods of equal length and then heating the member surface for a predetermined period of time within the confines of such divisions.

The control mechanisms will now be explained specifically by reference to FIG. 6. As shown, the revolution of the shaft 19 of a motor 18 equipped with a reduction gear is reduced through gears 20, 21 and transmitted to a worm shaft 22. The speed is further decreased by a worm 23 and a worm gear 24, so that the table 4 mounted on the spindle 3 can be turned at a very low speed. In the table turning mechanism of the construction above described, a cam plate 26 formed with a desired number of rectangular lobes 25 is fitted to the worm shaft 22, and limit switch means such as an approach switch 27 or microswitch is provided in close proximity to each of such lobes 25 thereby to detect each of equi-angular sectors of the angle of revolution of the table 4. After the motor 18 has been started and the motor revolution has attained a constant speed, hardening is initiated. Since the induction heating coil 8 is supported above the table 4 at a point ahead of the latter by a certain angle in the turning direction thereof, a limit switch 28 is set in the proximity of a position ahead by the above-said angle $\theta$ of a rectangular protuberance 30 of a cam plate 29 which is fitted to the spindle 3 of the table 4, so that the initiation and stopping positions for hardening can be detected. A speed control panel 31, which is a variety of graphic panel, comprises a dial 32 for basic speed setting and a plurality of sub-dials 33 for speed ratio setting, whereby the variations of turning speed of the table 4 in different regions are pre-set or beforehand set in terms of electrical amounts. The panel is also provided with a line 34 that represents the contour of member surface to be hardened, sectoral pilot lamps 35, arrow lamps 36 indicating the turning directions, quadrant pilot lamp 37, etc. which all serve to indicate the progress of hardening operation. Setting of this panel will now be described specifically in connection with the member 1 shown in FIG. 1. In turning the table 4 successively in the direction indicated by a solid arrow along the line 34, the dial 32 is set to a standard table turning speed which is governed by the type of the coil for induction heating and the manner in which the coil is held in working position. Next, the speed ratio setting sub-dial 33a for the first sector is set to a speed ratio of 1 to serve as a standard dial. The rest of subdials 33 are then set to different values of speed ratios required to render the area velocity of the member surface constant. Where it is desired to vary the hardening penetration in certain sectors of the member or where the turning speed of the table is to be increased for certain sectors of the member which have a hole so as to obtain the same depth of hardening, the local differences in hardening penetration are adjusted by modifying the settings on the speed ratio setting sub-dials. As the turning speed of the table 4 is shifted according to the speed settings, the sectoral pilot lamps 35 are lighted in succession along the line 34, first in the direction indicated by a solid arrow and then backward in the direction indicated by a dotted arrow, thus serving together with the directional pilot lamps 36 and quadrant pilot lamp 37 to indicate the progress of the hardening operation.

On the speed control panel 31, the number of sub-dials 33 provided for speed ratio setting varies depending on the contour of the member to be hardened regardless of whether the number of separate hardened layers or portions is same or not. For example, it is one half of and equal to the number of sectors $m$ of the members shown in FIGS. 7 and 8, respectively. The panel may be re-designed for any desired rearrangement of the pilot lamps, and the lamps may be omitted where unnecessary.

A control circuit 38 is so designed that, in response to a command from an operation panel 39 and upon receipt of signals from the limit switch 28 and approach switch 27, it gives necessary orders to a firing control circuit 40, a high frequency oscillating circuit 41 and a pre-set input change-over circuit 42 thereby to actuate the respective electric circuits.

The operation of the system will now be described. If a member 1 to be hardened is placed securely on the table 4 and the starting push button on the operation panel 39 is pressed, the control circuit 38 will instruct a solenoid valve (not shown) to move the induction heating coil or work coil 8 to a predetermined point above the member surface and, at the same time, give a start order to the firing control circuit 40. Since the pre-set input change-over circuit 42 is connected to the dial 32 and sub-dial 33a on the speed control panel 31 and an amount of electricity corresponding to the basic speed setting is given as input to the firing control circuit 40, the firing control circuit 40 upon receipt of the start order will work correspondingly to the input to actuate a rectifier circuit 43 and thereby drive the motor 18 at a desired speed. Then, the coil 8 will move to a predetermined point and the table 4 will reach the basic speed and turn by an angle $\theta$. From the time when the signal from the limit switch 28 is obtained, the control circuit 38 will count the number of signals from the approach switch 27 by means of a counter, and give input change-over orders to the pre-set input change-over circuit 42 at regular intervals of count, so that the latter in turn can successively change-over the connection with the speed ratio setting sub-dials 33 on the speed control panel 31 to change the turning speed of the table 4 accordingly by way of the firing control circuit 30 and rectifier circuit 43.

Meanwhile, from this point of time, the control circuit 38 upon receipt of each signal from the approach switch 27 will give an oscillating signal to the high frequency oscillating circuit 41, so that a high frequency current is intermittently flown through the coil 8 as it is supplied to the coil from the high frequency oscillating circuit 41 for intermittent periods of time pre-set by the timer 44 on the operation panel 39, whereby the member is hardened in radial streaks of parallel thin zones forming equidistantly broken concentric circles. In the case when the ratio of the total area of separate hardened layers to that of the remaining unhardened layers is desired to be kept constant, the time required for each turn of the table 4 is divided into equal time portions, each being $1/n$ of the total time, and the timer 45 on the operation panel 39 is set to these time portions and the change-over switch on the operation panel 39 is switched over to the equal time division, all before the starting of the operation. Then, the control circuit 38 will generate oscillating signals at the intervals of time pre-set on the timer 45, and in this case again the member will be partially hardened on the surface in the specific hardening pattern according to this invention. According to this equal time division system, narrower hardened layers are formed in closer order in the surface portion in which the radius vector is long than in the portion in which the vector is less long. In this case the signals from the approach switch 27 are used solely for the detection of the points of time for sending input change-over signals and initial oscillating signals.

When the table 4 has made a complete turn and a signal from the limit switch 28 has been obtained thus indicating the completion of hardening, the control circuit 38 discontinues the sending of the input changeover and oscillating signals and commands the solenoid valve to withdraw the coil 8 and, at the same time, commands the firing control circuit 40 to stop. After the table 4 has been stopped accordingly, the control circuit 38 further gives a reversing command to the table 4, which is then reversed at the basic speed to the starting position and is stopped there in preparation for the next hardening cycle.

In the detecting section of equi-angular division system of the control mechanism described above, it is possible to replace the cam plate 26 by a cam plate provided with lobes same in number as the hardened layers, the latter plate being adapted to be rotated at the same speed as that of the turntable 4. If, in this case, the center angles of the arcs of lobes are kept constant in such way that the arcuate lengths of the lobes serve, in place of the timer 44, to provide the time intervals for the supply of electricity, the area ratio of separate hardened layers and the remaining unhardened ones at any surface portion of the member can also be rendered substantially constant in the equi-angular division system. Also, instead of the setting section of the type using the speed ratio setting dials, a cam plate of the same contour as the member surface may be provided so that the length of rotatory radius vector can be detected as by a potentiometer to effect continuous variation of the turning speed of the table 4. Generally, however, the system using dials permits the electric circuits to be simplified in construction and adjusted with ease. A further advantage of this system is that it is applicable to members of the contours as shown in FIGS. 7 and 8 as well without the necessity of adding any special circuit to its original circuit.

In the block diagram the electric circuits illustrated may of course be those generally in use and the individual electric circuits may be modified or redesigned in a number of ways. Therefore, explanation in detail of these circuits and their specific connection diagrams are omitted here.

While the process of the present invention has so far been described in conjunction with a procedure whereby a member is partially hardened in the surface layer to form separate, linear hardened layers which are distributed in the surface layer radially and concentrically with respect to the center of the member, as shown in FIG. 1, it is alternatively possible to provide separate hardened layers in other desirable forms, e.g., a spiral or wavy formation, distributed in the same way as mentioned above. To attain this, it is only necessary to use an induction heating coil of a correspondingly modified surface contour or form.

This invention will be better understood by the following examples.

EXAMPLE 1

An oval-shaped, thin-walled member made of special cast iron, measuring 250 mm. in major axis, 190 mm. in minor axis and 40 mm. in height, and having a center hole with an inside diameter of 75 mm., and which was 5 mm. thick at the portion to be hardened, was placed securely on a table. A coil for induction heating equipped with a ferrite core and which measured 110 mm. in length and had a cross section of 8 mm. by 8 mm. was held in position above the radius vector of the member. While the member was being turned at a velocity of 0.25 to 0.5 r.p.m., it was partially hardened so that 72 separate hardened layers were formed in the surface layer in the radial and concentric pattern of distribution thereof as previously mentioned by flowing intermittently a high frequency current of 57 kw. through the coil from a vacuum-tube high frequency oscillator with a frequency of 200 kc. and output of 75 kw., by means of the isochronous division system with a time ratio 3:2 of partial hardening interval to heating. The total warpages of the test pieces hardened in this way were invariably within the range of 0.11 to 0.19 mm., or approximately one-third of those of test pieces conventionally hardened over the entire surface which range from 0.35 to 0.60 mm. The hardened faces were ground and then tested on an abrasion tester with a predetermined sliding piece held in pressure contact therewith under a certain load while the piece was being revolved at a high velocity on the tester. The test demonstrated that the member partially hardened in accordance with the present invention is similar or rather superior in wear resistance to the conventional products.

EXAMPLE 2

Each of side housings of special cast iron for a rotary piston engine, measuring 300 mm. in major axis, 260 mm. in minor axis, 40 mm. in height and 5 mm. in thickness at the inner wall thereof the surface of which was to be hardened, and having a center hole of 75 mm. in inner diameter, was partially quench hardened according to this invention so that 72 separate, linear hardened layers of each approximately 1 mm. in depth were formed in the same pattern of distribution thereof as in FIG. 1, the total area of these hardened layers being nearly 60% of that of the inner wall wherein they were formed.

Figure 9:
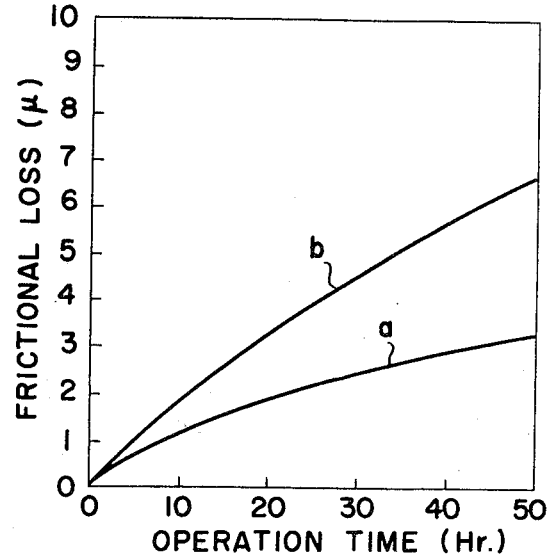
FIG. 9 is a graph showing a comparison of frictional loss between the mating members which move in sliding contact respectively with the partially hardened member of this invention and with the conventional hardened member.

The amount of warping of each of the side housings so hardened was within the range of 0.12 to 0.21 mm., or approximately one-third of that of the side housing conventionally hardened over the entire surface which ranges from 0.42 to 0.68 mm. The hardened faces were ground and then tested for abrasion on the tester with a predetermined sliding member of special cast iron held in pressure contact therewith under a facial pressure of 20 kg./cm.$^2$ while revolving the housing at a frictional velocity of 20 m./sec. on the tester, using spindle oil as a lubricant between the housing and the sliding member. The test showed that the housing partially hardened according to this invention is equal or somewhat superior in wear resistance to the conventional ones. As further indicated in FIG. 9 which shows a frictional loss curves $a$ and $b$ for said housing partially hardened on the surface according to this invention and the conventional one entirely hardened throughout the surface, respectively, it has been found that the frictional loss for the former is approximately half that for the latter and the former can decrease the mating member, which moves in sliding contact therewith, in frictional loss.

Figure 10:
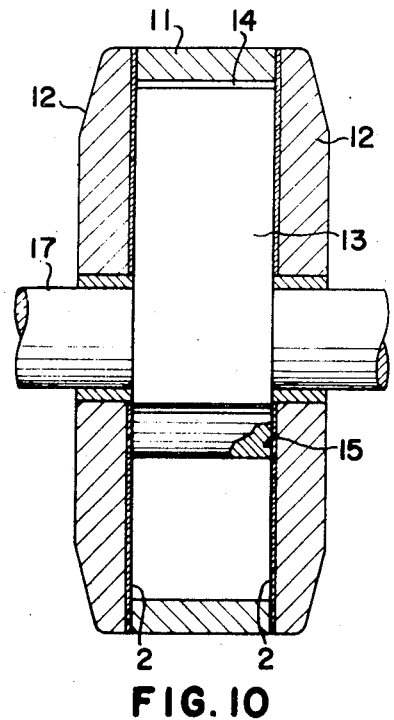
FIG. 10 is a vertical sectional view of a rotary piston engine to which partially hardened members of this invention are applied.
Figure 11:
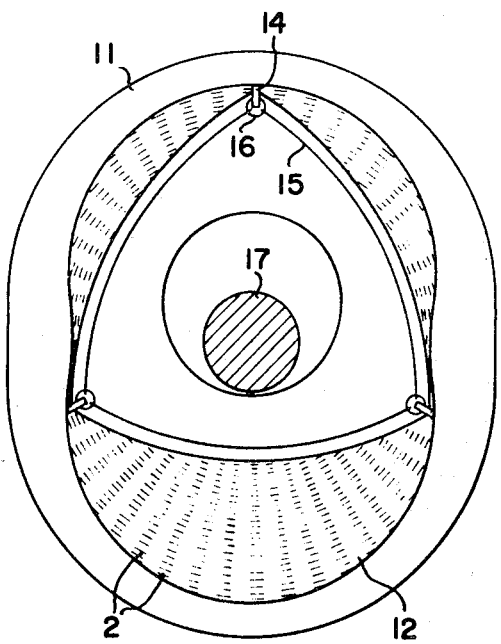
FIG. 11 is a side view of the rotary piston engine from which one of the side housings is removed.

As shown in FIGS. 10 and 11, in general, a rotary piston engine comprises a casing formed of a center housing 11 and side housings 12; a rotor 13 which is housed in the casing and makes an eccentric rotation while keeping airtight the spaces between the casing and the rotor with aid of apex seals 14, side seals 15 and corner seals 16, with which the rotor body is fitted, to repeat a four-stroke cycle operation consisting of intake, compression, explosion (power) and exhaust thereby transmitting the power so obtained to a rotating shaft 17; and the rotating shaft 17. In a rotary piston engine, when the side housings 12 partially hardened on the inner side according to this invention are applied, the side seals 15 will uniformly be worn because of their sliding movement made astride the separate hardened layers 2 of the side housings 12 and will have a remarkably longer lifetime as an advantage because of the marked reduction in frictional loss as previously mentioned, and the corner seals 16 will have the same advantage as well when the number of the separate hardened layers is large.

Thus, when other members than the side housings for a rotary piston engine are partially hardened according to this invention so that the mating member may slide on the partially hardened member astride the separate hardened layers formed in the surface portion of the latter, the mating member will have a longer life-time when in use. For example, side housings for a vane-type rotary compressor may be hardened according to this invention so that individual hardened layers are formed in spiral form whereby the vanes of the compressor are decreased in frictional loss and have a longer life-time when in use.

As has been described above, the present invention is directed to the partial hardening of a member by holding a coil for induction heating over the radius vector of the surface to be hardened of a member being turned on a turntable, in such manner that the alternate magnetic flux density is rendered generally uniform on the surface, and flowing a high frequency current intermittently through the coil while the member is being continuously revolved, thereby forming separate hardened layers in the surface portion in such radial and concentric pattern of distribution thereof as shown in FIG. 1. Therefore, the process and apparatus of this invention are applicable to the surface hardening of flat articles with a number of advantages. Not only is uniform hardening penetration attained but the quenching strain is minimized and the grinding after quenching can be accomplished within an extremely short period of time by the practice of this invention. Furthermore, the articles thus partially hardened possess very good wear resistance. These desirable products can be obtained with a high degree of efficiency in accordance with the present invention.

Further advantages of more uniform hardening penetration and more improved quality of hardened members will be obtained by carrying out a modified process wherein, as a rule, green members are partially hardened while being continuously revolved under the gradual or continuous control of speed so as to render the area velocity of the member surface constant. Even greater qualitative improvements of hardened workpieces will be made possible by carrying out the partial hardening operation with a high frequency current passed through the coil intermittently at isochronously divided intervals, because the area ratio of the hardened layers and the unhardened ones at any surface portion of the member can thereby be rendered substantially constant.

What is claimed is:

1. A mechanical member with a flat, anti-wear surface with which a mating member moves in sliding contact, the improvement wherein the mechanical member has separate hardened layers which are disposed between unhardened areas on said flat surface and wherein said separate hardened layers are distributed on the flat surface radially and concentrically with respect to a predetermined point on said flat surface, thereby providing the member with anti-wear properties with reduced warpage and strain on said member.

2. A mechanical member according to claim 1 wherein said member is a side housing for a rotary piston engine.

3. A process for the partial hardening of a mechanical member with a flat anti-wear surface comprising the steps of supporting an induction heating coil above a radius vector of the flat surface layer to be partially hardened, applying a high frequency electric current intermittently through the heating coil, maintaining substantially uniform an alternating magnetic flux number per unit area of the flat surface, revolving the member continuously thereby induction hardening separate spaced layers on said flat surface which are distributed on said flat surface radially and concentrically with respect to a predetermined point on said flat surface, and quenching the heated portions by a cooling medium.

4. A process according to claim 3 comprising controlling the rotation of said member such that the area of said flat surface which passes under the heating coil per unit of time is maintained substantially constant.

5. A process according to claim 3 comprising applying said intermittent electric current at time intervals determined by any one of equal angular divisions of the flat surface to be partially hardened and isochronous divisions thereof.

References Cited
UNITED STATES PATENTS 3,408,237  10/1968  Gulliksen et al. _____ 148—39

RICHARD O. DEAN, Primary Examiner

U.S. Cl. X.R.

148—35, 39, 152, 154